United States Patent Office 3,671,212
Patented June 20, 1972

3,671,212
GROWTH-PROMOTING COMPOSITIONS AND METHODS

Ernest G. Jaworski, Olivette, Mo., assignor to Monsanto Company, St. Louis, Mo.
No Drawing. Continuation-in-part of application Ser. No. 883,336, Dec. 8, 1969. This application Oct. 13, 1970, Ser. No. 80,479
Int. Cl. A01n 9/12; A61k 27/00
U.S. Cl. 71—77    12 Claims

ABSTRACT OF THE DISCLOSURE

The growth of living organisms is stimulated by augmenting the nutrient medium utilized by the organism with 4-methylthiobutyric acid or a biological equivalent of said acid.

---

This application is a continuation-in-part of copending application Ser. No. 883,336, filed Dec. 8, 1969.

This invention relates to growth-promoting compositions and to methods of stimulating the growth of living organisms.

In accordance with this invention, it has been found that the growth of living organisms is stimulated by the addition of a growth-promoting amount of 4-methylthiobutyric acid to the nutrient source utilized by the living organism. Plants growing in a nutrient medium augmented with an effective amount of 4-methylthiobutyric acid grow at a substantially greater rate than plants growing in the nutrient medium alone. Animal diets containing 4-methylthiobutyric acid elicit a greater rate of growth in animals than when said diets are used alone.

When reference is made herein to the use of 4-methylthiobutyric acid as a growth promotant it is to be understood that its biological equivalents can be employed in place of the acid to stimulate the growth of living organisms. There can be used, for example, 4-methylthiobutyramide, 4-methylthiobutyraldehyde and the lower alkyl esters such as methyl, ethyl, propyl and butyl esters of said 4-methylthiobutyric acid. Additionally, the ammonium salt or the alkali and alkaline earth metal salts such as sodium, potassium, calcium and the like can be used in place of the acid in this invention.

4-methylthiobutyric acid is prepared in general by condensing methyl mercaptan with 4-chlorobutyronitrile and hydrolizing the resulting product. For example, in a suitable vessel is placed 200 ml. of absolute ethyl alcohol and 7.7 g. of sodium. To this cooled solution is added 16.2 g. of methyl mercaptan and 33.8 g. of 4-chlorobutyronitrile. The reaction mixture is refluxed for 2-3 hours and the sodium chloride is filtered off and the solvent evaporated to yield 4-methylthiobutyronitrile. This nitrile is placed in a suitable vessel and 60 g. of sodium hydroxide in 300 ml. of water is added. This mixture is refluxed until there is no further evolution of ammonia. The alkaline solution is acidified with hydrochloric acid an extracted with ether to yield 4-methylthiobutyric acid.

The various biological equivalents of 4-methylthiobutyric acid which are useful in the practice of this invention can be prepaed by conventional methods known in the art.

The stimulation of growth of a living organism is accomplished in accordance with this invention by a method which comprises augmenting the nutrient medium utilized by said organism with a growth-promoting amount of a compound of the formula

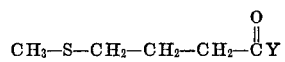

wherein Y is selected from the group consisting of —OH, —H, —NH$_2$, —ONH$_4$, —OR wherein R is alkyl of not more than 4 carbon atoms and —OM/V wherein M is metal selected from the group consisting of the alkali and alkaline earth metals and V is the valence of said metal.

The term "active agent" as used herein refers to one or more of the compounds of the above formula.

In carrying out the methods of this invention the active agent can be added to the nutrient medium utilized by the living organism as a compound per se or in combination with one or more diluents in liquid or solid form. As used herein, the term "diluent" includes carriers or extenders as well as other materials conventionally used in the nutrient medium. Compositions comprising the active agent and a diluent are particularly useful to facilitate adequate dispersion of the active agent throughout the nutrient medium.

In accordance with this invention, the stimulation of plant growth is obtained by augmenting the nutrient medium for said plants with an effective amount of the active agent. The term "plant" as used herein and in the appended claims is inclusive of seeds, i.e. the propagative plant structure, sprouts, emerging seedlings and established woody and herbaceous vegetation including the roots and above-ground portions.

Various means can be used to stimulate plant growth with the active agent such as applying the active agent, or compositions comprising the active agent, to the soil or other plant growth medium or to the plants themselves with sprayers, dusters, spreaders, drills and the like. When applied to the soil, both broadcast and band treatments can be used with or without incorporation depending upon the nature of the crop. Additionally, the active agent can be added to a portion of the water used by the plant for healthy growth.

A particularly advantageous method of stimulating plant growth is the treatment of seeds with the active agent prior to planting. This preplant treatment of the seeds results in a better stand of the planted crop. The seeds can be treated with an effective amount of the active agent by known procedures. For example, the seeds can be soaked, sprayed, blended, dusted, coated or slurried with the active agent or preferably with compositions containing the active agent in the form of a solution, emulsion, suspension, dust, wettable powder, adhesive coating and the like. In this manner the nutrient medium utilized by the plant during germination or sprouting is augmented and improves the stand of plants. This preplant treatment of the seed can be conveniently employed by the seed supplier.

These methods can be employed to stimulate the growth of numerous types of plants such as field crops, vegetables, ornamentals, fruits, nuts and the like. Illustrative field crops are cotton, soybeans, corn, wheat, oats, barley, rice, tobacco, sugarcane, sugarbeets, alfalfa, clover, and the like. Representative vegetables include beans, peas, lettuce, cabbage, tomatoes, carrots, radishes, beets, peppers, onions and potatoes. Illustrative ornamentals include chrysanthemum, gladiolus, tulips, roses, orchids, azalea, carnation and zinnia. Fruits and nuts include apples, pears, peaches, plums, cherries, apricots, oranges, lemons, bananas, pineapples, blueberries, strawberries, cranberries, melons, grapes, coffee, pecans, walnuts, almonds, filberts and cashews.

To stimulate the growth of animals in accordance with this invention, the active agent is used to augment the animal's diet and can be administered to the animal sub-cutaneously or intramascularly in a suitable form, but it is generally more convenient to administer the active agent orally to the animal. Preferably, the active agent is incorporated into the animal's feed or drinking water.

The stimulation of the growth of living organisms such as bacteria and fungi can be obtained by the practice of this invention by adding an effective amount of the active agent to the nutrient medium such as the nutrient mediums employed by the fermentation industry.

In general, the effective growth-promoting amounts of the active agents of this invention used to stimulate the growth of a living organism depend upon the particular organism and its environment and is readily determined by conventional procedures.

An application of the active agent at a rate of from about 0.01 pound to about 10 pounds per acre to the plants or to the soil utilized by the plants stimulates the growth of plants. The application can be made at one or more of the various stages of plant development, for example, prior to planting, after emergence, during early growth or during maturation to improve the plant's vigor, growth or the quality of the harvested crop. Treating seeds prior to planting by soaking the seeds in from about $10^{-2}$ to about $10^{-10}$ molar solution of the active agent for a period of 1 to 48 hours stimulates the growth of the planted seed to provide a better stand. Preferably the seeds are soaked in $10^{-4}$ to $10^{-8}$ molar solution for a period of from 2 to 24 hours.

The incorporation of from about 0.0001% by weight to about 0.1% by weight of the active agent into the ration of an animal, such as poultry, swine, fish and ruminants, stimulates the growth of said animals.

Having discussed this invention in broad and general terms and certain features with varying degrees of particularity, it is believed that further discussion of the invention will be more beneficial in conjunction with detailed working examples. It is to be understood that the examples found herein below are illustrative and are not limiting, the same being offered merely to facilitate the understanding of the present invention. The more desirable ranges for ordinary applications of my invention are indicated herein, and these can also be ascertained from the specific illustrative examples presented. However, for any particular application of my invention, the most desirable conditions can be readily determined by routine trial by one skilled in the art, such a determination being facilitated by the discussion presented herein and in the examples.

EXAMPLE 1

Soybeans, *Glycine max.* variety Hill, were treated with a slurry of commercial nitrogen-fixing inoculum (Nitragin-The Nitragin Co., Inc.) using 3 gms. per 50 ml. water. The soybeans were planted at one-half inch depth in coarse vermiculite and soil (2:1 vol. by vol.) contained in 4 inch diameter pots and were watered from the top and held in a greenhouse.

One week after planting, the plants were watered with 50 ml. of a nutrient solution containing the following:

Nutrient Solution A:         Amount for 10 liters
```
K2HPO4·3H2O _____gms__  1.13
KH2PO4 _____gms__  0.68
K2SO4 _____gms__  2.58
MgSO4·7H2O _____gms__  2.46
Sodium ferric diethylenetriamine penta acetate
    _____mgs__ 25.00
```

Amount for 100 ml.—
                add 10 ml. to 10 liters
Nutrient Solution B:      of Solution A, mgs.
```
H3BO3 _____ 72.0
MnSO4H2O _____ 38.0
ZnSO4·7H2O _____ 11.0
Na2MoO4·2H2O _____  1.2
CaSO4·5H2O _____  3.9
```

The nutrient solution was watered on the pots at weekly intervals throughout the experiment. When plants reached the 1st trifoliolate leaf stage, solutions of the test compound 4-methylthiobutyric acid were watered (50 ml.) on the pots twice a week with an interval of 3 days between treatments. The test compound was prepared for addition to the post as follows:

Sixty-seven mgs. 4 - methylthiobutyric acid was dissolved in 500 ml. water ($10^{-3}$ M). This concentrate was then diluted to provide the following test solutions.

|  | Mgs./50 ml. |
|---|---|
| Solution 1 | 1.34 |
| Solution 2 | 0.134 |
| Solution 3 | 0.0134 |
| Solution 4 | 0.00134 |

Fifty ml. of the test solutions were watered on duplicate pots twice a week as indicated above. Deionized water was watered on the control pots. The plants were grown for 9 weeks and harvested. The results are reported in Table 1.

TABLE I

| Treatment | Plant height (in.) | Nodules (gms.)/10 plants | | Fresh wt. yield percent control |
|---|---|---|---|---|
| | | Fresh wt. | Dry wt. | |
| Control | 20 | 2.60 | 0.52 | 100 |
| Solution 1 | 23 | 2.90 | 0.63 | 112 |
| Solution 2 | 24 | 3.50 | 0.80 | 135 |
| Solution 3 | 24 | 3.20 | 0.71 | 123 |
| Solution 4 | 23 | 3.60 | 0.84 | 139 |

A soybean study using hydroponics was carried out in order to demonstrate the plant growth promoting effect of 4-methylthiobutyric acid and to assess the effects of L-methionine under identical control conditions. This study was conducted in accordance with Example 2 below.

EXAMPLE 2

Soybeans, *Glycine max.* var. Dare were planted in gravel contained in 4 inch pots. The pots were placed in the greenhouse on benches fitted to pump an aqueous nutrient medium over the gravel. The nutrient passed through the pots, was collected in a tank and recycled through the pots for the length of the experiment.

One week after planting, each pot was inoculated with 100 ml. of a Nitragin preparation containing 10 gms. of Nitragin in 3550 ml. of water.

The nutrient solution used in the hydroponic growth study of nodulating soybeans was prepared as follows:

Nutrient Solution A:       Amount for 100 liters
```
K2HPO4·3H2O _____gms__  11.4
KH2PO4 _____gms__   6.8
K2SO4 _____gms__  25.8
MgSO4·7H2O _____gms__  24.6
Ca(Cl)2 _____gms__  55.5
Sodium ferric diethylenetriamine penta acetate
    _____mgs__ 250.0
```

Amount for 1 liter—add 100 ml.
Nutrient Solution B:   to 100 liters of Solution A, mgs.
```
H3BO3 _____ 720
MnSO4·H2O _____ 380
ZnSO4·7H2O _____ 110
CuSO4·5H2O _____  39
Na2MoO4·2H2O _____  12
```

The compound under evalution was introduced into the hydroponic nutrient solution as an aqueous concentrate to yield a final concentration of $10^{-7}$ M. The compound was added to fresh nutrient medium on alternate days through the experiment beginning one week after inoculation.

Eight replicate pots containing 3 plants per pot were used for each treatment. Plants were harvested 7½ weeks following planting. Heights of plants, weights of tops and roots and weights of nodules were obtained for all treatments. Results are presented in Table II.

TABLE II

| Treatment | Plant height (ins.) | | Fresh weights (gms.) per pot | | | | Grams per pot, nodules | |
|---|---|---|---|---|---|---|---|---|
| | | | Tops | | Roots | | | |
| | Height | Percent control | Weight | Percent control | Weight | Percent control | Weight | Percent control |
| Control | 20.3 | 100 | 53.9 | 100 | 32.2 | 100 | 3.9 | 100 |
| 4-methylthiobutyric acid, $10^{-7}$M | 29.5 | 146 | 117.9 | 219 | 70.8 | 220 | 5.1 | 130 |
| L-methionine, $10^{-7}$M | 17.4 | 86 | 22.8 | 42 | 17.7 | 55 | 1.6 | 42 |

Further growth studies were conducted on plants of the genus Spirodela. The growth promoting effect of 4-methylthiobutyric acid is demonstrated in Example 3.

EXAMPLE 3

*Spirodela polyrhiza*, giant duckweed, was grown in flasks containing 100 ml. of the following nutrient solution diluted as indicated. The reagents were prepared in deionized water. The reagents listed below were added to 600 ml. of deionized water in the order presented and the pH was adjusted to 5.6 with 2 M KOH and the volume to 1 L with deionized water to form 1 L of concentrate.

| Reagent | Volume to be used | Final concentration [a] |
|---|---|---|
| $K_2$EDTA, .4 M in .8 M KOH | 66.7 ml | $2.0\times10^{-4}$M |
| $Fe(NO_3)_3 \cdot 9H_2O$, .5 M | 6.7 ml | $2.5\times10^{-5}$M |
| $MnCl_2 \cdot 4H_2O$, .1 M | 6.7 ml | $5.0\times10^{-6}$M |
| $NaMoO_4 \cdot 2H_2O$, .01 M | 6.7 ml | $5.0\times10^{-7}$M |
| $H_3BO_3$, .1 M | 66.7 ml | $5.0\times10^{-5}$M |
| $CuCl_2 \cdot 6H_2O$, .01 M | 6.7 ml | $5.0\times10^{-7}$M |
| $KH_2PO_4$, 1 M | 33.3 ml | $2.5\times10^{-4}$M |
| KCl, .1 M | 6.7 ml | $5.0\times10^{-5}$M |
| $(NH_4)_2SO_4$, 3 M | 33.3 ml | $7.5\times10^{-4}$M |
| $MgSO_4 \cdot 7H_2O$, 1 M | 33.3 ml | $2.5\times10^{-4}$M |
| $ZnCl_2$, 2 M | 1.7 ml | $2.5\times10^{-5}$M |
| $KNO_3$ | 107.7 gms | $8.0\times10^{-3}$M |
| $Ca(NO_3)_2 \cdot 4H_2O$, 2 M [b] | | $1.0\times10^{-3}$M |

[a] Refers to the final concentration of each reagent in the medium after dilution of 7.5 ml. of concentrate to 1L with tap water.
[b] 0.5 ml. of this reagent is added per liter of nutrient medium prepared from the above concentrate.

The duckweed was transferred at weekly intervals into fresh medium and grown under continuous fluorescent lights (1200 ft. candles) at 82° F. These cultures served as a source of inoculum for the experiments. Using the above nutrient medium growth studies were carried out in petri plates containing 20 ml. of nutrient solution or 20 ml. of nutrient solution with the indicated amount of test chemical. Plates were inoculated with 3 fronds of duckweed and placed in the constant light-temperature environment. Two replicates were used for each level of chemical and six control plates were used. Frond (leaf) counts were made at various intervals and plates were harvested after 144 hours. After harvesting, the fresh weights of the fronds were obtained by weighing fronds after blotting with paper toweling. Fresh fronds were dried in a vacuum oven at 40° C. for 24 hours to obtain dry weights. Table III summarizes the results of this study.

TABLE III

| Treatment | Average number of fronds per plate after 144 hrs. | Weight of fronds per plate (mgs.) | |
|---|---|---|---|
| | | Fresh | Dry |
| Control | 23 | 40 | 9 |
| 4-methylthiobutyric acid: | | | |
| $10^{-4}$ M | 16 | 27 | |
| $10^{-5}$ M | 28 | 76 | 15 |
| $10^{-6}$ M | 31 | 62 | 13 |
| $10^{-7}$ M | 27 | 87 | 14 |
| $10^{-8}$ M | 24 | 44 | 9 |

EXAMPLE 4

Growth studies using the sodium salt of 4-methylthiobutyric acid were carried out in accordance with the procedure of Example 3. The results are set forth in Table IV.

TABLE IV

| Treatment | Average number of fronds per plate after 168 hrs. | | Fresh weight of fronds per plate (mgs.) | |
|---|---|---|---|---|
| | Number | Percent of control | Weight | Percent of control |
| Control | 71 | 100 | 250 | 100 |
| Sodium 4-methylthiobutyrate: | | | | |
| $10^{-7}$ M | 98 | 138 | 299 | 120 |
| $10^{-8}$ M | 81 | 114 | 280 | 112 |

EXAMPLE 5

Rice seeds, variety Blubelle, were soaked for 24 hours in an aqueous solution containing $10^{-5}$, $10^{-6}$ and $10^{-7}$ moles of 4-methylthiobutyric acid. Seeds soaked in water served as control. After soaking, the seeds were planted in pots containing a mixture of equal volumes of sand and soil. Twelve seeds were planted in each pot and 3 pots were used for each treatment. The average percent stand 6 and 10 days after planting for each treatment is as follows:

| Treatment | Percent stand after— | |
|---|---|---|
| | 6 days | 10 days |
| Water (control) | 64 | 86 |
| $10^{-5}$ M solution | 83 | 97 |
| $10^{-6}$ M solution | 92 | 94 |
| $10^{-7}$ M solution | 78 | 92 |

EXAMPLE 6

Following the procedure of Example 5, cotton seeds, variety Delta Pine were soaked for 2, 6, and 24 hours in aqueous solutions containing $10^{-5}$, $10^{-6}$ and $10^{-7}$ moles of 4-methylthiobutyric acid. Stand determinations were made 9 days and again 21 days after planting. The average stand for each treatment expressed as percent of the control soaked in water for a like period of time is as follows.

| | Concentration | Stand percent of control | |
|---|---|---|---|
| | | 9 days | 21 days |
| Soak time, hours: | | | |
| 2 | $10^{-5}$ M | 133.3 | 127.8 |
| 2 | $10^{-6}$ M | 133.3 | 122.8 |
| 2 | $10^{-7}$ M | 133.3 | 122.8 |
| 6 | $10^{-5}$ M | 107.9 | 100.0 |
| 6 | $10^{-6}$ M | 184.8 | 169.3 |
| 6 | $10^{-7}$ M | 138.6 | 123.2 |
| 24 | $10^{-5}$ M | 201.7 | 215.4 |
| 24 | $10^{-6}$ M | 192.7 | 200.2 |
| 24 | $10^{-7}$ M | 178.4 | 192.4 |

The above results from treated seed show that the initial stand is improved and that the improvement is maintained in the growing plants indicating increased vigor.

The growth promoting effect of 4-methylthiobutyric acid in animals is demonstrated in Example 7.

EXAMPLE 7

A basic broiler ration formulated to meet 100% of the minimum requirement for amino acids was prepared with the following ingredients with the parts indicated as percent by weight:

| Ingredient: | Wt. percent |
|---|---|
| Ground yellow corn | 50.60 |
| Soybean oil mean (50% protein) | 34.89 |
| Defluorinated phosphate (18% P) | 2.49 |
| Alfalfa meal | 2.00 |
| Corn gluten meal (43% protein) | 2.00 |
| Dicalcium phosphate (18.5% P) | 0.44 |
| Della mix+zinc | 0.10 |
| Salt | 0.55 |
| Choline chloride (70%) | 0.025 |
| Tallow | 6.53 |
| DL-methionine<br>Vitamin premix | } 0.118 |
| B complex+A and D | 0.25 |
| Santoquin [1] antioxidant | 0.0125 |
| | 100.0 |

[1] Reg trademark of Monsanto Company for ethoxyquin.

The basal ration was fed to male Vantress-Cornish chicks for a period of 28 days. Twelve birds were used for each experimental group and eight groups were used per treatment. The chicks were vaccinated against New Castle and bronchitis at 4 days of age and received conventional antibiotic supplement in the drinking water for the first 7 days. The results of this feeding experiment were as follows:

| Ration | Average/bird (gms.) Gain | Feed intake |
|---|---|---|
| Basal | 519 | 793 |
| Basal plus 0.001% 4-methylthiobutyric acid | 542 | 835 |
| Basal plus 0.003% 4-methylthiobutyric acid | 533 | 821 |

Bacterial growth studies were conducted on bacterium of the genus Bacillus. The growth promoting effect of 4-methylthiobutyric acid is demonstrated in Example 8.

EXAMPLE 8

Shake flasks were inoculated with Bacillus pumilis. The flasks contained a sterile nutrient solution containing the following:

| Nutrient ingredients: | Gm./3.5 liters |
|---|---|
| Fishmeal | 50.685 |
| Cornsteep | 156.190 |
| Enzose | 131.950 |
| Cerelose | 90.930 |
| $CaCO_3$ | 17.500 |
| Ca (acetate)$_2$ | 3.500 |
| Antifoam | 11.725 |
| $KNO_3$ | 3.570 |
| Water | 3.500 |

(pH 4.8 initially—12 ml. 50% KOH added to give pH 6.75).

Flasks (4-baffled, 2 liter Erlenmeyer) were incubated at 35° C. on a rotary shaker at 250 r.p.m. (1 inch eccentricity), and the gaseous phase was replaced with an air purge of 500 ml./min. Aliquots of the culture were removed for determination of turbidity (O.D. 660) as a measure of growth. The results are set forth in Table V.

TABLE V

| Concentration of 4-methyl-thiobutyric acid: | O.D. 660 turbidity |
|---|---|
| 0 (Control) | 5.8 |
| 0 (Control) | 6.0 |
| $10^{-7}$ M | 18.0 |
| $10^{-7}$ M | 11.6 |
| $10^{-8}$ M | 15.4 |
| $10^{-8}$ M | 43.0 |

The growth-promoting compositions of this invention are particularly useful in the application of the active agent to soil utilized by plants. These compositions comprising an effective amount of active agent and a particular carrier are in the form of granules, dusts, wettable powders and the like. Suitable particulate carriers are solids in finely-divided form.

Particulate carriers include the natural clays such as china clays, bentonites and attapulgites; other natural mineral such as talc, quartz, diatomaceous earth, chalk, fullers earth, kaolin, kieselguhr and volcanic ash; the chemically modified minerals such as acid-washed bentonite, calcined magnesia and colloidal silica; and other solid materials such as fertilizers, perlite, vermiculite, powdered cork, powdered wood, charcoal, ground corncobs and ground or powdered nutshells.

In addition to the active agent and particulate carrier the growth-promoting compositions can contain other formulating materials such as surfactants, stabilizers, sticking agents and the like. Other additaments such as fertilizers, herbicides, fungicides, insecticides, nematocides and the like can be added to provide compositions having a broader spectrum of activity.

The growth-promoting compositions can be in the form of a concentrate sold to the user which is further diluted with an additional liquid or solid carrier prior to application. Such concentrates generally contain from about 5% to 80% by weight of the active agent. The growth-promoting compositions which are to be applied without further dilution generally contain from about 0.1% by weight to about 20% by weight of the active agent based on the total weight of the composition.

The animal feed compositions of the invention can be prepared by incorporating the active agent in various ways into the components of the animal feed for the type of animal in question. The active agent can be added to the ration as the pure compounds, as a stabilized concentrate, as a solution or as an emulsion.

The basic animal feed modified in accordance with this invention, can be any of those known in the art such as feeds for poultry, pigs, calves, lambs, cattle and other domestic animals. The basic animal feeds are usually rather complex mixtures containing nutrient elements such as wheat, corn, coats, fish meal, meat meal, dried milk, soybean oil meal, alfalfa meal and the like. To these nutrients there is commonly added limestone, salt, vitamins, antibiotics, medicaments, antioxidants and the like.

The active agents useful in this invention are incorporated in animal feed compositions in an effective amount over a wide range of concentrations. Significant animal responses are obtained with feed compositions containing from about 0.0001% to about 0.1% by weight of the active agent. Preferably, the feed compositions contain from about 0.0005% to about 0.05% by weight of the active agent. The preferred amount will vary to some extent depending upon the weight, age and environment of the particular species of animal being fed.

Although the invention is described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

The embodiments of the invention in which an exclusive property or privilege is claimed are defined as follows:

1. A growth-promoting composition comprising a particulate carrier and an effective amount of a compound of the formula

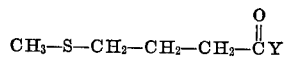

wherein Y is selected from the group consisting of —OH, —H, —NH$_2$, —ONH$_4$, —OR wherein R is alkyl of not more than 4 carbon atoms and —OM/V wherein M is metal selected from the group consisting of the alkali and alkaline earth metals and V is the valence of said metal.

2. A method of stimulating the growth of a plant which comprises applying to said plant a growth-promoting amount of a compound of the formula

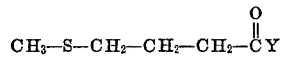

wherein Y is selected from the group consisting of —OH, —H, —NH$_2$, —ONH$_4$, —OR wherein R is alkyl of not more than 4 carbon atoms and —OM/V wherein M is metal selected from the group consisting of the alkali and alkaline earth metals and V is the valence of said metal.

3. A method in accordance with claim 2 wherein said compound is 4-methylthiobutyric acid.

4. A method in accordance with claim 2 wherein said plant is soybean.

5. A method in accordance with claim 2 wherein said compound is applied to seed.

6. A method in accordance with claim 5 wherein said compound is applied to rice seed.

7. A method in accordance with claim 5 wherein said compound is applied to cotton seed.

8. A method in accordance with claim 7 wherein said compound is 4-methylthiobutyric acid.

9. A method of stimulating the growth of plants growing in soil which comprises applying to the soil a growth-promoting amount of a compound of the formula

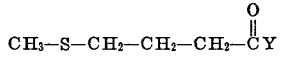

wherein Y is selected from the group consisting of —OH, —H, —NH$_2$, —ONH$_4$, —OR wherein R is alkyl of not more than 4 carbon atoms and —OM/V wherein M is metal selected from the group consisting of the alkali and alkaline earth metals and V is the valence of said metal.

10. A method in accordance with claim 9 wherein the plants are soybean.

11. A method in accordance with claim 9 wherein the plants are rice.

12. A method in accordance with claim 9 wherein the compound is 4-methylthiobutyric acid.

No references cited.

RICHARD L. HUFF, Primary Examiner

U.S. Cl. X.R.

71—98; 424—311, 320, 317, 333, 335